United States Patent [19]
Fowler

[11] B 3,985,038
[45] Oct. 12, 1976

[54] SELF-ALIGNING IDLER
[75] Inventor: Gene Roger Fowler, Geneseo, Ill.
[73] Assignee: Deere & Company, Moline, Ill.
[22] Filed: Apr. 14, 1975
[21] Appl. No.: 567,854
[44] Published under the second Trial Voluntary Protest Program on February 3, 1976 as document No. B 567,854.

[52] U.S. Cl............................................. 74/242.1 A
[51] Int. Cl.².......................................... F16H 7/12
[58] Field of Search.............. 74/242.1 A, 242.14 R, 74/243 R

[56] References Cited
UNITED STATES PATENTS
| | | | |
|---|---|---|---|
| 1,803,186 | 4/1931 | Hendrickson | 74/242.1 A X |
| 2,193,936 | 3/1940 | Ostand et al. | 74/242.1 A X |
| 2,823,553 | 2/1958 | Harrington | 74/243 R |
| 3,666,322 | 5/1972 | Pickron | 74/243 R X |

Primary Examiner—Leonard H. Gerin

[57] ABSTRACT

A self-propelled combine has a series of rotary paddles for moving the crop rearwardly along the feeder housing from the platform to the combine separation system. The paddles are driven by a series of interconnected chain drives on the side of the feeder house, each drive including a chain trained around sprockets on the adjacent paddle shafts, and each drive is provided with an adjustable idler to vary the chain tension. Each idler includes a hexagonal shaft mounted in a support for adjustment normal to the shaft axis, and a ball type bearing is mounted on the shaft, the bearing having an inner periphery conforming to the shaft cross section so that it is axially slidable but nonrotatable thereon. The outer race of the bearing is provided with a sprocket that engages the drive chain, and the idler shift freely shifts along the shaft within limits to stay in alignment with the driven and driven sprockets.

10 Claims, 3 Drawing Figures

SELF-ALIGNING IDLER

BACKGROUND OF THE INVENTION

This invention relates to an idler in a drive system of the type utilizing an endless flexible drive element, such as a chain or the like, and more particularly to a rotatable idler that is self-aligning with respect to the endless flexible drive element that it engages.

Idlers for endless flexible drives are conventionally rotatably mounted on a support structure by means of some type of bearing, it being well known to mount the idler on a fixed shaft be means of a ball bearing. Heretofore, the idler bearings have had conventional circular axial bores, although it is also known to provide ball bearings with noncircular axial openings for mounting the bearing on a corresponding noncircular shaft in some other applications. Also, previous idlers have been difficult to adjust, and generally have not been self-aligning, so that they automatically retain their alignment with the other components in the drive system.

SUMMARY OF THE INVENTION

According to the present invention, improved means are provided for mounting a rotatable idler on a support structure so that the idler is self-aligning. An important feature of the invention resides in the use of a bearing having a noncircular axial opening, the bearing being mounted on a shaft having a cross section corresponding to the bearing opening so that a bearing is axially shiftable but nonrotatable on the shaft, whereby the idler is free to shift along the shaft to stay in alignment with the endless flexible drive element that it engages. More particularly, the idler is mounted on a shaft having a hexagon shaped cross section via a bearing having a hexagon shaped axial opening.

An important feature of the invention resides in the provision of means for simply adjusting the position of the shaft of the idler of the above general type to allow simple adjustment of the tension in the endless flexible drive element.

Also, according to the invention, stop means are provided on the shaft to limit the axial shifting of the idler thereon.

DESCRIPTION OF THE PREFERRED EMBODIMENT

Figure 1:
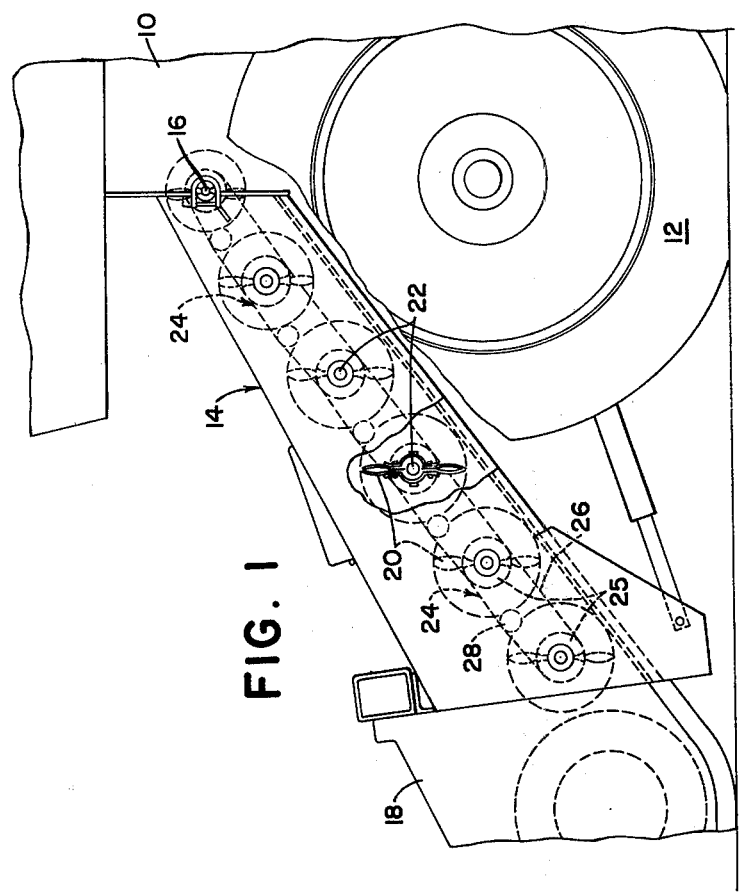
FIG. 1 is a schematic side elevation view of a forward portion of a self-propelled combine having a drive system for the feeder house conveyor that incorporates the improved idler according to the present invention.

The invention is embodied in a self-propelled combine having a main separate body 10 mounted on a pair of forward drive wheels 12, only a forward portion of the combine being shown. As is conventional, the combine includes a forwardly extending feeder house 14 that is vertically adjustable about a transverse pivot 16 at its rearward end and carries a harvesting platform or header 18 at its forward end. The header 18 removes the crop from the field as the machine advances and delivers it rearwardly through the forward end of the feeder house 14, from where it is conveyed upwardly and rearwardly through the feeder house by a series of adjacent paddle type conveyors 20. Each conveyor includes a transverse shaft 22, and the shafts are in turn driven by a series of chain drives 24 on the right side of the feeder house.

Each chain drive includes drive and driven sprockets 25 and a chain 26 trained around the drive and driven sprockets 25, an idler 28 engaging the upper run of the chain between the drive and driven sprockets, the sprockets, the chain, and the idler all being schematically shown in dotted lines in FIG. 1. As is apparent, the rearwardmost drive connects the shaft 22 that is coaxial with the pivot 16 to the adjacent shaft 22, which in turn is connected to its forwardly adjacent shaft by the second drive from the rear, and so forth, so that the paddles are all rotated in the same direction, the rearwardmost shaft being driven by a conventional drive system from a power source (not shown) on the combine.

Each idler 28 includes a support 30 attached to the right side wall of the feeder house 14 and having a generally U-shaped cross section with an outer wall 31 parallel to the feeder house side wall. The outer wall 31 is provided with an upwardly and forwardly inclined slot 32, that extends perpendicular to the upper run of the chain 26, and the support also includes an upright member 34 normal to the wall 32 and disposed adjacent to one side of the slot 32.

Figure 3:
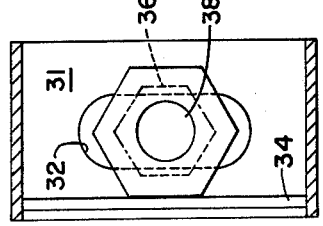
FIG. 3 is an end view of the mounting structure for the idler, showing the idler shaft but not the idler mounted on the structure.

The idler also includes an axially transverse shaft 36 having a hexagonal cross section except for a relatively short threaded portion 38 at its inner end. As is apparent from FIG. 3, the minimum width of the hexagonal portion of the shaft is greater than the width of the slot 32, while the diameter of the threaded portion 38 is less than the width of the slot 32 and extends therethrough, the shoulder on the shaft 36 at the transition from the outer side of the support wall 32. A nut 40 is threaded on the threaded portion 38 and also has a width greater than the width of the slot 32, so that when the nut seats on the inner surface of the wall 32 the shaft 36 is clamped to the support 30.

Figure 2:
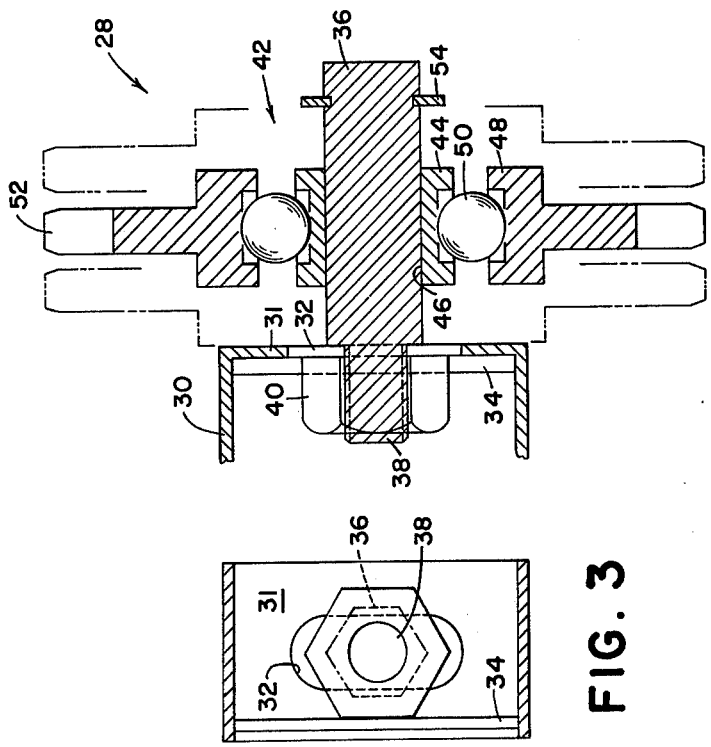
FIG. 2 is an axial section through the idler with the extreme positions of the idler on the shaft being indicated in broken lines.

An annular ball bearing 42 includes an inner race 44 having a hexagonal shaped axial opening 46 that substantially conforms to the cross section of the hexagonal portion of the shaft 36, the bearing 42 being mounted on the shaft so that it is axially slidable but nonrotatable thereon. The bearing also includes an outer race 48 with a plurality of balls 50 between the inner and outer races as is conventional, and the outer race 48 is integrally connected to a sprocket or idler element 52, that is coaxial with the bearing and engages the inner side of the chain 26. The shaft 36 is provided with a circumferential groove adjacent its outer end, and a snap ring 54 is removably mounted in the groove to prevent the bearing from sliding off the end of the shaft, while permitting removal or assembly of the idler bearing and sprocket on the shaft when the snap ring is removed. As is apparent, the snap ring forms a stop that limits the outermost position of the sprocket, which is indicated in broken lines in FIG. 2, while the innermost position of the sprocket, which is also shown in broken lines in FIG. 2, is established by the bearing engaging the outer surface of the wall 32 of the support.

In operation, the idler sprocket is free to shift in an axial direction with its bearing so that it stays in alignment with the chain that it engages, eliminating wear and other problems associated with misalignment between the idler and the chain, such as occur as a result of manufacturing and assembly variables in the mounting of the drive and driven sprockets on their respective shafts. The tension in the chain is easily adjusted by rotating the shaft 36 until it is unclamped from the support, the nut 40 being prevented from rotation by engagement with the member 34, and thereafter sliding the shaft along the slot 32 to the desired position, whereupon the shaft can again be clamped to the support by merely rotating the shaft in the appropriate direction. As is apparent, the hexagonal shaped outer end of the shaft provides a convenient means for tightening or loosening the shaft by means of a conventional hexagon shaped wrench.

I claim:

1. In a drive system having an endless flexible drive element trained around rotary drive members, the combination therewith of an improved rotary idler engaging said drive element and comprising: a support; an elongated shaft having an axis extending generally parallel to the axis of the rotary drive members and having a noncircular cross section; means mounting the shaft on the support; an annular bearing having an inner race nonrotatably mounted on the shaft and axially shiftable thereon and a rotatable outer race; an outer rotary idler element connected to the outer race for rotation therewith in engagement with the drive element; and stop means operatively associated with the shaft for limiting the axial shifting of the bearing thereon.

2. The invention defined in claim 1 wherein the means mounting the shaft on the support includes adjusting means operative to provide selective adjustment of the shaft on the support in a direction normal to the shaft axis to vary the position of the idler relative to the rotary drive members and thereby vary the tension in the drive element.

3. The invention defined in claim 2 wherein the adjusting means comprise a slot in the support extending in the direction of adjustment and having a lesser width than the cross section of the shaft between the stop means, the shaft having a reduced diameter threaded portion extending through the slot and nut means threadable on the threaded portion and engageable with the support adjacent to the slot to releasably clamp the shaft to the support.

4. The invention defined in claim 3 wherein the shaft has a regular polygonal cross section.

5. The invention defined in claim 4 wherein the shaft has a hexagonal cross section.

6. The invention defined in claim 5 wherein the drive element comprises a drive chain and the rotary idler element comprises a sprocket engageable with the chain, the chain positioning the bearing and the sprocket carried thereby along the shaft into alignment with the rotary drive members.

7. The invention defined in claim 6 wherein the stop means is formed by the support adjacent one end of the shaft and a snap ring mounted adjacent to the other end of the shaft.

8. The invention defined in claim 1 wherein the shaft has a regular polygonal cross section.

9. The invention defined in claim 1 wherein the drive element comprises a drive chain and the rotary idler element comprises a sprocket engageable with the chain, the chain positioning the bearing and the sprocket carried thereby along the shaft into alignment with the rotary drive members.

10. The invention defined in claim 1 wherein the stop means is formed by the support adjacent one end of the shaft and a snap ring mounted adjacent to the other end of the shaft.

* * * * *